Oct. 20, 1931.  J. L. BARBER  1,827,927

PHOTOGRAPH PRINT EMBOSSING MACHINE

Original Filed Dec. 22, 1928  3 Sheets-Sheet 1

Inventor
Joseph L. Barber
By Clarence A. O'Brien
Attorney

Oct. 20, 1931.  J. L. BARBER  1,827,927
PHOTOGRAPH PRINT EMBOSSING MACHINE
Original Filed Dec. 22, 1928   3 Sheets-Sheet 2
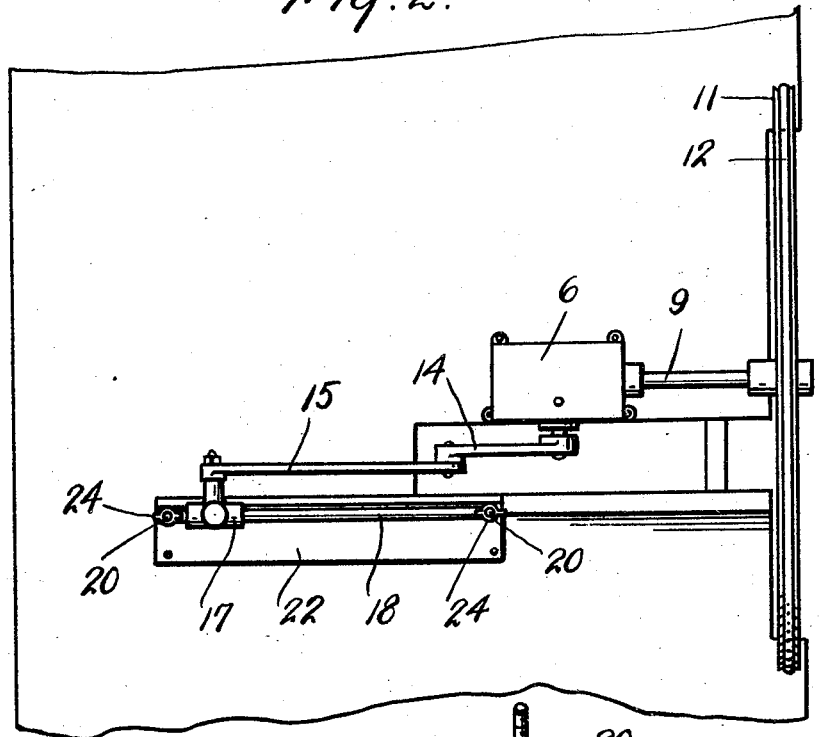
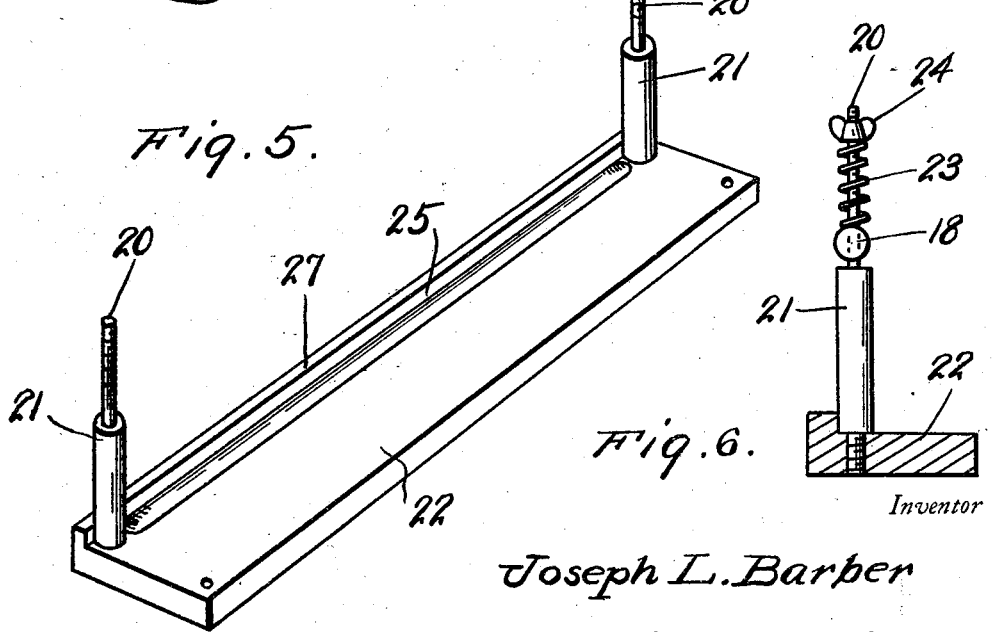
Inventor
Joseph L. Barber
By Clarence A. O'Brien, Attorney Oct. 20, 1931. J. L. BARBER 1,827,927
PHOTOGRAPH PRINT EMBOSSING MACHINE
Original Filed Dec. 22, 1928 3 Sheets-Sheet 3
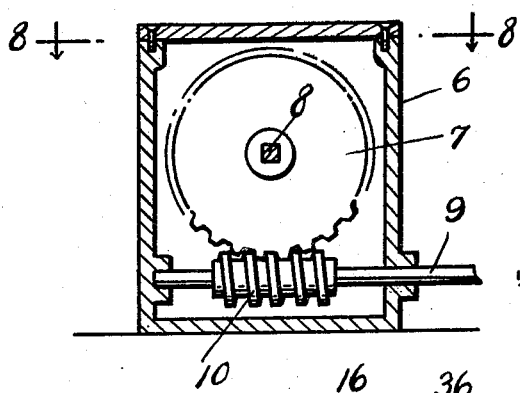
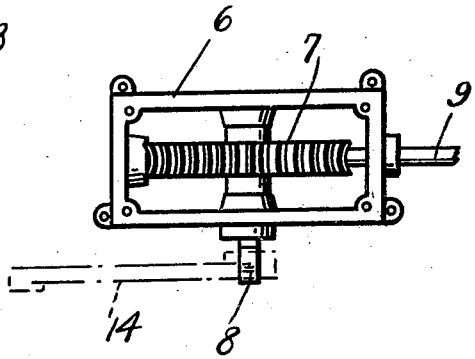
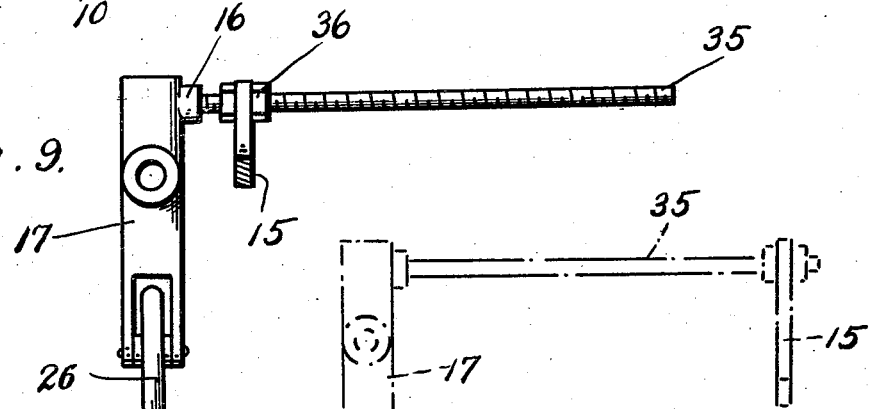
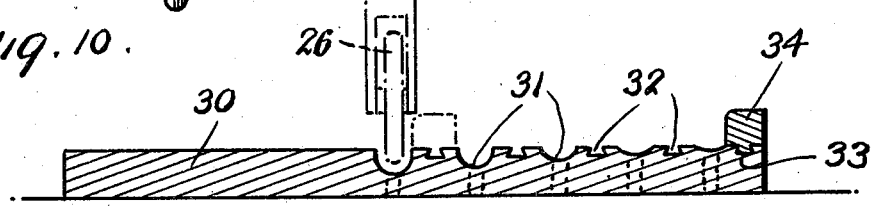
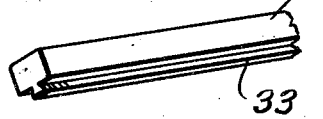
Inventor
Joseph L. Barber
By Clarence A. O'Brien
Attorney Patented Oct. 20, 1931

1,827,927

UNITED STATES PATENT OFFICE

JOSEPH L. BARBER, OF GREELEY, COLORADO

PHOTOGRAPH PRINT EMBOSSING MACHINE

Application filed December 22, 1928, Serial No. 328,002. Renewed August 28, 1930.

The present invention relates to embossing machines and is adapted for use particularly in embossing the edges of photographic prints.

An object of the invention is to provide an embossing machine including a plate having embossing means, guide means supported adjacent the embossing means and means movable along the guide means including an embossing element for co-operating with the embossing means, the machine also desirably including a stop member for positioning the work adjacent said embossing means.

A further object is to provide an embossing machine comprising a plate having a plurality of spaced apart embossing means of varying dimensions, guide means which can be supported adjacent any one of the embossing means, means movable along the guide means including an embossing element complemental to each one of the embossing means and adapted to selectively cooperate with any one of said embossing means to operate upon work, the machine also desirably including a stop member for selectively positioning the work adjacent any one of the embossing means, and mechanism for adjusting the embossing element transversely of the spaced apart embossing means.

A further object is to provide a plurality of interchangeable embossing plates, one of said plates having a plurality of spaced parallel grooves formed in its upper surface varying in depth and providing means for adjustably positioning the reciprocally actuated roller for travelling movement in either of the grooves whereby to produce embossed edges upon the prints of varying elevations upon the surface thereof.

A still further object is to provide a machine of this character which may be either hand or power operated, which embodies simplicity of construction, efficiency in operation, and which is otherwise well adapted for the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a front elevational view of the machine,

Figure 2 is a top plan view,

Figure 3 is a vertical sectional view taken substantially along a line 3—3 of Figure 1, Figure 4 is a perspective view of the guide bar for the reciprocally actuated roller, Figure 5 is a similar view of one form of embossing plates, Figure 6 is a transverse vertical sectional view therethrough, Figure 7 is a vertical sectional view through the gear casing, Figure 8 is a horizontal sectional view through the casing taken substantially along a line 8—8 of Figure 7, Figure 9 is a side elevational view of the reciprocably actuated roller provided with the adjusting screw for selectively positioning the roller with respect to the grooves of the embossing plate.

Figure 10 is a transverse sectional view through a modified form of embossing plate and Figure 11 is a fragmentary perspective view of the adjustable guide strip for the roller.

Referring now to the drawings in detail, wherein for the purpose of illustration I have disclosed a preferred embodiment of the invention, the numeral 5 designates a work table having a gear casing 6 secured to the top thereof within which a worm gear 7 is rotatably supported upon a shaft 8 journaled in the opposite sides of the casing.

A drive shaft 9 extends through one end of the casing with its inner end provided with a worm 10 operatively engaged with the gear 7. The outer end of the shaft is provided with a pulley wheel 11 operated by means of a belt 12 through an electric motor 13 supported beneath the surface of the table 5.

To one end of the shaft 8, is suitably attached a crank arm 14 having a pitman 15 operatively connected at its outer end, the outer end of the pitman being pivotally attached to a projection 16 formed at one side of a carriage 17.

The carriage 17 is formed with a bore extending horizontally therethrough at a plane at right angles to the projection 16 whereby to provide means for slidably mounting the carriage upon a rod 18. The ends of the rod 18 are provided with vertically extending openings 19 through which pins 20 are inserted.

The pins 20 extend upwardly from standards 21 suitably secured adjacent the opposite ends of an embossing plate 22. The rod 18 is yieldably held downwardly upon the pin 20 by means of coil springs 23 carried on the pins and adjustably secured in position by wing nuts 24.

The upper surface of the plate 22 is formed with a groove 25 disposed in longitudinal alinement with the standards 21 and within which the rim of a wheel 26 rotatably supported upon the carriage, is adapted to travel.

The rear edge of the plate 22 is formed with an upstanding flange 27 disposed longitudinally along the rear edge of the groove 25.

It will be apparent that the rod 18 provides guide means along which the embossing element 26 is directed, and that the upstanding flange 27 provides a stop member for positioning the work adjacent the embossing means.

In the operation of the device the plate 22 is secured upon the table in a proper position so that the wheel 26 will travel in the groove 25 of the plate and the photographic print indicated at 28 is placed face downwardly upon the plate with one edge abutting the flange 27 and disposed over the groove 25.

The machine is then operated whereby to cause the wheel 26 to reciprocally travel over the face whereby to crease the edge of the print in the groove. By reason of this creasing action an embossed edge will be formed upon the surface of the print.

In lieu of the power drive means for the carriage, a handle 29, shown by the dotted lines in Figure 3 of the drawings, may be attached to the projection 16 in place of the pitman 15, whereby to provide for the manual operation of the carriage.

Also the embossing plate designated at 30, in Figure 10 of the drawings may be substituted for the plate 22, said substitute plate having a plurality of spaced parallel grooves 31 formed in its upper surface, and of varying depths.

Disposed between each of the grooves 31 is formed a dovetailed channel 32 adapted for receiving a complementary shaped rib 33 formed on the under side of a guide strip or stop member 34. The guide strip or stop member 34 may accordingly be adjusted for cooperation with each groove 31 when the wheel 26 is arranged to travel therein.

In order to operatively connect the carriage 17 with the pitman for selective movement in the respective grooves, a screw 35 is fitted in the projection 16 of the carriage and to which the outer end of the pitman 15 is pivotally connected, the pitman being secured in adjusted position with respect to the screw by means of nuts 36.

Through the use of the plate 30 the extent of the elevation of the embossed edge may be regulated.

It is obvious that my invention is susceptible to various changes and modifications in construction without departing from the spirit of the invention or the scope of the appended claims, and I accordingly claim all such forms of the device to which I am entitled.

It will of course be understood that standards such as 21 will be employed in connection with the embossing plate 30 of Fig. 10, and that said standards will be removably and selectively attachable to said embossing plate at the location of each of the grooves 31. See the dotted lines in said Fig. 10 below the grooves 31 indicating holes to receive the lower reduced ends of the standards after the fashion as shown in Fig. 6.

Having thus described my invention, what I claim as new is:

1. An embossing machine comprising a plate including embossing means, guide means supported adjacent said embossing means, and means movable along said guide means including an embossing element for cooperating with said embossing means.

2. An embossing machine comprising a plate including embossing means, guide means adjacent said embossing means extending longitudinally thereof, and means movable along said guide means including an embossing element complemental to said embossing means for coperating therewith.

3. An embossing machine comprising a plate adapted to have work placed thereon and including embossing means which said work is adapted to overlie, guide means supported adjacent said embossing means, and means movable along said guide means including an embossing element complemental to said embossing means and adapted to cooperate therewith to form an impression upon said work.

4. An embossing machine comprising a plate adapted to have work placed thereon and including embossing means which said work is adapted to overlie, guide means adjacent said embossing means extending longitudinally thereof, and means movable along said guide means including a rotatable embossing element for cooperating with said embossing means to form an impression upon said work.

5. An embossing machine comprising a plate including embossing means, guide means supported adjacent said embossing means, means movable along said guide means including an embossing element for cooperating with said embossing means, and a stop member adjacent said embossing means.

6. An embossing machine comprising a plate including embossing means, guide means adjacent said embossing means extending longitudinally thereof, means movable along said guide means including an embossing element complemental to said embossing means for cooperating therewith and a stop member adjacent said embossing means and parallel therewith.

7. An embossing machine comprising a plate adapted to have work placed thereon and including embossing means which said work is adapted to overlie, guide means adjacent said embossing means extending longitudinally thereof, means movable along said guide means including an embossing element for cooperating with said embossing means to form an impression upon said work, and a stop member for the work adjacent said embossing means and parallel therewith.

8. An embossing machine of the class described comprising an embossing plate having a recess formed in the surface thereof and adapted to have the work placed thereon so as to overlie the recess, a slide bar, supporting means therefor carried by the plate, a carriage mounted for reciprocal sliding movement on said bar and an embossing element on the carriage adapted to seat in said recess whereby to form an impression in the work corresponding with the outline of the recess.

9. An embossing machine of the class described comprising an embossing plate having a groove formed in the surface thereof, a slide bar, supporting means therefor carried by the plate, a carriage mounted for reciprocal sliding movement on said bar an embossing member mounted on the carriage adapted to travel in said groove, said plate being suitable for receiving the work in overlapping relation with the groove and stop means for one edge of the work extending upwardly from the rear edge of said groove.

10. An embossing machine of the class described comprising an embossing plate having a groove formed in the surface thereof, a slide bar, supporting means therefor carried by the plate, means yieldably urging the bar downwardly, a carriage mounted for reciprocal sliding movement on said bar, and an embossing member mounted on the carriage and adapted to travel in said groove.

11. An embossing machine of the class described comprising an embossing plate having a groove formed in the surface thereof, a slide bar, standards extending upwardly from the plate at the opposite ends of said grooves, means for yieldably securing the opposite ends of said bar upon said standards, a carriage mounted for reciprocal sliding movement on said bar, and a rotatable embossing member mounted on the carriage and adapted to travel in said groove.

12. An embossing machine comprising a plate including a plurality of spaced apart embossing means, guide means adapted to be supported adjacent any one of said embossing means, and means movable along said guide means including an embossing element complemental to each one of said embossing means for selectively cooperating with any one of said embossing means.

13. An embossing machine comprising a plate including a plurality of spaced apart embossing means of varying dimensions, a stop member, means for selectively positioning said stop member adjacent any desired one of said embossing means, guide means adapted to be supported adjacent any one of said embossing means, and means movable along said guide means including an embossing element for selectively cooperating with any one of said embossing means.

14. An embossing machine comprising a plate adapted to have work placed thereon and including a plurality of spaced apart embossing means of varying dimensions each of which embossing means said plate is adapted to selectively overlie, guide means adapted to be supported adjacent any one of said supporting means, and means movable along said guide means including an embossing element complemental to each one of said embossing means for selectively cooperating with any one of said embossing means to form an impression upon said work.

15. An embossing machine comprising a plate adapted to have work placed thereon and including a plurality of spaced apart embossing means of varying dimensions each of which embossing means said plate is adapted to selectively overlie, guide means adapted to be supported adjacent any one of said supporting means, means movable along said guide means including an embossing element complemental to each one of said embossing means for selectively cooperating with any one of said embossing means to form an impression upon said work, a stop member for the work, and means for selectively positioning said stop member adjacent any desired one of said embossing means and parallel therewith.

16. An embossing machine comprising a plate having a plurality of spaced apart embossing means of varying dimensions, guide means adapted to be supported adjacent any one of said embossing means, means movable along said guide means including an embossing element complemental to each one of said embossing means for selectively cooperating with any one of said embossing means, and means including a screw for adjusting said embossing element transversely of said spaced apart embossing means.

17. An embossing machine of the class described comprising an embossing plate having a plurality of spaced parallel grooves formed in the surface thereof of varying depths, channels formed in the plate between said grooves, a stop rail removably secured in said channels for selective positioning with respect to said grooves, a pair of standards removably secured to the plate for positioning at the ends of said grooves, a slide bar supported upon said standards in spaced relation above said grooves, yieldable means carried by the standards urging said bar downwardly, a carriage mounted for reciprocal sliding movement on said bar, a wheel mounted on the carriage and adapted to travel in said grooves, a drive shaft, a pitman operatively connected thereto, and means connecting the pitman with said carriage for adjustment of the carriage transversely with respect to said pitman.

18. An embossing machine of the class described comprising an embossing plate having a plurality of spaced parallel grooves formed in the surface thereof of varying depths, channels formed in the plate between said grooves, a stop rail removably secured in said channels, standards removably secured to the plate for positioning at the ends of said grooves, a slide bar supported upon said standards in spaced relation above said grooves, yieldable means carried by the standards urging said bar downwardly, a carriage mounted for reciprocal sliding movement on said bar, a wheel mounted on the carriage and adapted to travel in said grooves, a drive shaft, a pitman operatively connected thereto, and means connecting the pitman with said carriage for adjustment of the carriage transversely with respect to said pitman, and an embossing member movably mounted above the plate and adapted to selectively travel in said grooves.

19. An embossing machine of the class described comprising an embossing plate having a plurality of spaced parallel grooves formed in the surface thereof of varying depths, channels formed in the plate between said grooves, a stop rail removably secured in said channels for selective positioning with respect to said grooves, and a pair of standards removably secured to the plate for positioning at the ends of said grooves, a slide bar supported upon said standards in spaced relation above said grooves, yieldable means carried by the standards urging said bar downwardly, a carriage mounted for reciprocal sliding movement on said bar, a wheel mounted on the carriage and adapted to travel in said grooves, a drive shaft, a pitman operatively connected thereto, and means connecting the pitman with said carriage for adjustment of the carriage transversely with respect to said pitman, and an embossing member movably suspended above the plate for travelling longitudinally thereof, said member being adjustable transversely of said grooves for selective positioning therein.

In testimony whereof I affix my signature.

JOSEPH L. BARBER.